United States Patent [19]

Eriksson et al.

[11] 4,260,644

[45] Apr. 7, 1981

[54] PREPARATION OF FOOD FUNCTIONAL PROTEINS

[75] Inventors: Caj. E. A. Eriksson, Mölnlycke; Svein Tjelle, Landvetter, both of Sweden

[73] Assignee: Svenska Institutet for Konserveringsforskning, Gothenberg, Sweden

[21] Appl. No.: 39,655

[22] Filed: May 15, 1979

Related U.S. Application Data

[63] Continuation of Ser. No. 821,304, Aug. 2, 1977, abandoned, which is a continuation of Ser. No. 640,549, Dec. 15, 1975, abandoned, which is a continuation-in-part of Ser. No. 394,869, Sep. 6, 1973, abandoned.

[30] Foreign Application Priority Data

Sep. 8, 1972 [SE] Sweden .............................. 11601/72

[51] Int. Cl.$^3$ ............................................... A23J 3/00
[52] U.S. Cl. ..................................... 426/656; 426/657; 426/574; 426/524; 426/802
[58] Field of Search ............... 426/104, 574, 656, 657, 426/384, 385, 524, 459, 802; 260/112 R, 119, 121, 123, 122, 120, 123.5, 123.7

[56] References Cited

U.S. PATENT DOCUMENTS

| | | | |
|---|---|---|---|
| 2,377,853 | 6/1945 | Boyer et al. | 260/123.5 |
| 2,384,673 | 9/1945 | Grettie | 260/118 |
| 2,445,028 | 7/1948 | Jones et al. | 260/123.7 |
| 2,450,810 | 10/1948 | Opper et al. | 260/123.5 |
| 2,717,836 | 9/1955 | Brody | 260/112 X |
| 3,218,307 | 11/1965 | Eldridge et al. | 426/656 X |
| 3,490,914 | 1/1970 | Okumura et al. | 260/123.5 |
| 3,585,179 | 6/1971 | Samejima et al. | 260/112 R |
| 3,870,808 | 3/1975 | Boyer et al. | 426/802 X |
| 3,891,774 | 6/1975 | Baker et al. | 426/802 X |

*Primary Examiner*—Esther M. Kepplinger
*Attorney, Agent, or Firm*—Kenyon & Kenyon

[57] ABSTRACT

Food functional proteins are prepared by dissolving or dispersing protein from a proteinaceous material in water containing urea or guanidine hydrochloride as dissolving or dispersing agents, separating the protein solution from nondissolved substances and recovering the protein from the protein solution by precipitation or gel formation, all additions and operations being performed in order to introduce and keep intact texturization sites in the protein. The final texture strength is then selected and affected by subjecting the protein having the preformed texture sites to changes in the chemical or physical environments involving changes of pH, electrolyte content, organic solvents, food ingredients and temperature. The final texture is eventually developed by freezing or drying.

2 Claims, 8 Drawing Figures

PREPARATION OF FOOD FUNCTIONAL PROTEINS

This is a continuation, of application Ser. No. 821,304 filed Aug. 2, 1977 which was a continuation of Ser. No. 640,549 filed Dec. 15, 1975 which was a continuation-in-part of Ser. No. 394,869 filed Sept. 6, 1973 all now abandoned.

BACKGROUND OF THE INVENTION

This invention relates to a method of making protein preparations from proteinaceous material. The protein preparations obtained are food functional and are intended to be used as food.

In recent years many methods have been developed for the production of protein concentrates intended for human consumption. However, most of these products have not been used for their intended purpose, but for animal food due to their lack of food functional properties. The ever increasing need for highly nutritional proteins calls for improved procedures which allow proteins from fish to be converted into food functional protein concentrates for use in conventional foods.

Many processes exist for the preparation of protein concentrates based on dissolving and recovery of the protein. Dissolution can be performed in water, organic solvents or mixtures thereof in order to separate the dissolved protein from insoluble matter.

Many proteins, particularly those in higher plants and microorganisms, are soluble in water alone or water containing some salt, while proteins in animal tissues are less soluble in water or weak salt solutions. Most proteins in most types of tissues are associated with other kinds of material such as carbohydrates and fat. Much of this non-protein material is associated with the protein when the latter is dissolved at high concentrations in water as in the case of the preparation of protein concentrates and thus the protein will still be contaminated with these carbohydrates and fat.

Protein preparations for food use should have functional properties involving a texture that can withstand chewing, high water and fat binding capacity, no contribution to flavor or still better a positive contribution to flavor, and a high nutritive value.

In order to facilitate the dissolution of large amounts of protein in water and to break its association with non protein material, various chemicals can be added. These chemicals are mostly alkaline, acid or hydrotropic agents as for example carbamide (urea) and guanidine hydrochloride.

For purposes of convenience and not limitation, the following discussions will refer to carbamide only as a hydrotropic agent. However, it is also intended that guanidine hydrochloride be equally applied as a hydrotropic agent.

Alkaline and acid processes

Strong alkali and acids have been used mainly with proteins from plants and microorganisms to dissovle the protein by converting it into its electrically charged forms. After separation of insoluble matter the protein is recovered by precipitation at the isoelectric pH by addition of alkali to an acid protein solution or addition of acid to an alkaline protein solution. In both cases practically no acid or alkali remains at the isoelectric pH (normally the isoelectric pH for these proteins are in the region 4.5–6.0).

The precipitation is due to the formation of few but strong electrostatic forces between the protein molecules. In order to obtain texturized protein concentrates the protein precipitate can be coagulated further by heat while simultaneously mechanically extruded through orifices. Another method is to redissolve a protein precipitate in alkali, force the alkaline solution through fine orifices into an acid coagulation bath to form protein threads or films. Such protein threads may be further mechanically treated to form fibrous structures which provide a meat-like impression when used in foods.

Hydrotropic processes

Carbamide acts in a completely different way than acids or alkalis as a protein dissolving aid. It both interacts with the numerous weak non-electrostatic forces between protein-protein or protein-non-protein molecules and forms molecular bridges between the protein and surrounding water. It is believed that it is the carbamide-protein complex that remains dissolved in water. The properties of the complex are influenced by strongly alkaline and acid conditions and by the temperature. In order to dissolve proteins completely, a large excess of carbamide in relation to the protein is needed. Unfortunately carbamide is also known to denature proteins in water. A denatured uncharged protein is normally insoluble in water. The carbamide-denatured protein complex is however still soluble. If carbamide is removed from the complex two phenomena will take place. First the protein molecules will replace its manyfold weak binding forces to the disappearing carbamide with similar binding forces to other proteins. If the binding sites have been kept intact by the mild conditions during the foregoing operations, the non-electrostatic protein-protein interaction will result in a protein precipitate different than that obtained in alkaline or acid processes, a gel-like (jelly) precipitation being formed, whereas the alkaline or acid precipitation is granulous. Secondly, on breaking the carbamide-protein complex the protein will start to return to its native (undenatured) state which tends to redissolve with loss of the precipitated protein.

Carbamide in high concentration has been used to dissolve proteins in procedures for obtaining protein solutions and preferably protein concentrates from proteinaceous materials; see U.S. Pat. No. 2,717,835. In the process described in the patent, carbamide, after dissolving or liquefying of the protein, is not dissociated from the protein. Its concentration is instead preferably increased by evaporation of the water. The final product is thus still a mixture of the original amount of carbamide and protein. In another method according to U.S. Pat. No. 2,717,836 the carbamide is removed from the mixture by dilution with water to a fermentable range, fermentation in the presence of added molasses and yeast, and finally by the action of urease. In the fermentation procedures, most of the carbamide-nitrogen and some of the protein-nitrogen will be converted into yeast-nitrogen and since the carbamide-nitrogen is far in excess of the protein-nitrogen the final product will consist mainly of yeast, excess molasses and only a small amount of the original protein. No texturization occurs.

In other procedures carbamide has been used together with strong acid (U.S. Pat. No. 3,585,179) or strong alkali (U.S. Pat. No. 2,450,810). These procedures however do not introduce any preformation of texture sites on the protein. This is particularly pointed out in Example 8 of U.S. Pat. No. 3,585,179 where dialysis of a carbamide ex ract of a previously acid treated protein did not form a gel or a texture during freeze-drying.

Freezing-denaturation as a means of forming structures has previously been described. In U.S. Pat. No. 2,377,853 for example this phenomenon was used in order to concentrate an alkaline protein precipitate by a slow-freezing process, rapid freezing being unusable. The resulting product has no texture since it does not form a continuous structure that can withstand mechanical force and is easily dispersed in water. U.S. Pat. No. 3,490,914 also describes freeze-denaturation of a protein-carbohydrate product preceded however by three more steps: separating suspension water, comminuting and redispersion of the precipitate. The texture of the final protein-carbohydrate sponge is formed spontaneously and was not controlled in any way.

SUMMARY OF THE INVENTION

We have now found that it is possible to prepare protein preparations having food functional properties by dispersing protein from a proteinaceous material in a medium comprising water containing a dispersing agent consisting of carbamide or guanidine hydrochloride at a neutral pH, whereafter the protein of the dispersion is precipitated after being separated from undispersed material, texturization of said protein being carried out by freezing or drying. Before use the product should preferably be thawed. The term "disperse" is also meant to include "dissolve," since dissolving can be said to be the limit of dispersing. Also the term "precipitation" is used in a broad sense and is meant to include also "gel formation" or "gelling." The term "neutral pH" is meant to include preferably the pH range of about 4–7. The temperature during the process should not exceed 65° C. Before the texturization there is carried out a texture affecting step or in other words a preformation of texture sites. This texture affecting step is carried out on the protein precipitation separated. Every procedure that dissociates the carbamide-protein complex under conditions which does not destroy the protein sites which take place in the final texturization will affect amorphous precipitation or gelling of the protein.

The proteinaceous starting material can be particularly fish, meat, shellfish, plants, microorganisms and fungi. Among shellfish, Euphaucids ("krill") and among plants, algea may be employed. As a protein source or starting material protein concentrates obtained from other processes can also be used. Such protein concentrates may be flotated protein from slaughter-house or fish-filleting plants.

The dispersing or dissolving is conducted in a water solution together with a high concentration of the protein dispersing agent by grinding, mixing or stirring and the dispersion is separated from fat, bone, cartilage, cellulose, starch, etc. contained therein by filtration, for example. The dispersion after the separation step contains dispersed (dissolved) proteins and other water soluble components of the starting material.

The precipitation and dissociation of the carbamide-protein complex can be accomplished by separating the dispersing agent from the protein. This can be done in a number of ways, as e.g. by dilution, membrane processes, membraneless diffusion, mobility separation and gravity separation as well-known in the art. The resulting precipitate consists almost completely of water containing protein while other components remain dissolved and can easily be removed by washing. Any residues of carbamide can specifically be removed by using the enzyme urease, simply by adding for instance small amounts of active soy flour.

The final texturization (the development of texture) is performed by freezing at $-2°$ C. to $-30°$ C., including freeze-drying or lyophilization; see Kirk-Othmer: Encyclopedia of Chemical Technology, Second Edition, vol. 7, pp. 368–370, and vol. 13, pp. 177–178; or drying as e.g. by heating up to 100° C. or above at subatmospheric, atmospheric or superatmospheric pressure. The drying is normally carried out to a dry substance content of less than 10% (w/w), preferably to about 5–6%.

The dispersing agents used can in principle be recovered completely for reuse in the process or elsewhere. Carbamide can for instance be used as a nitrogen fertilizer in agriculture or forestry, as ingredient in ruminents' feed or as a nitrogen source in various kinds of fermentation processes. Carbamide, which is a natural constituent in biological material as milk, fish and blood, is toxically and hygienically unobjectionable.

The texture affecting step can be performed in several ways, the most preferred method being the influence of pH adjustment in the range of 4–10; a preferred method is adjustment of the ionic strength (i.e. 0–5% salt concentration) and a preferred method in special cases is addition of other protein; other methods are heating up to 100° C. or addition of food components or, less preferred, treatment with samll amounts of organic chemicals (alcohols, as e.g. lower alkanols); it is also possible to use any combination of these methods. This texture affecting step provides a latent texture and does not influence the aspect of the protein preparation as seen by the naked eye; however, the viscosity is increased.

According to the invention the final protein preparation, food combination or finished food can be provided with an elective food functional texture. The resulting protein has a high nutrition value, as the essential amino acids and the biological values are intact even after prolonged exposure to carbamide.

In table I the amount (grms) of amino acids per 16 grms of nitrogen in the protein concentrate (equals about 100 grms of protein) have been listed after analysis of two differently processed cod proteins, one haddock, one herring and one pea protein at somewhat different processing conditions. The first six amino acids (Lys, Thr, Met, Val, Leu and Ile) are the essential ones in this list. Comparing cod protein processed at 8° C. for 48 hrs. at 23° C. for 2 weeks and haddock protein (very like cod protein) at 5° C. for 5 months shows that no significant changes have been introduced during the exaggerated longer processing time. With reference to available published data of amino acid compositions of proteins all these protein concentrates have their original composition of essential amino acids intact as measured by physico-chemical methods.

A good chemical composition of a protein does however not necessarily mean that it also has a good biological nutritive value. Table II shows that rats fed the first two protein concentrates of table I could utilize them both for growth equally well (digestibility) or even better (biological value) than a control group of rats which was fed casein (a milk protein normally used as a reference because of its high nutritive value).

Figure 1:
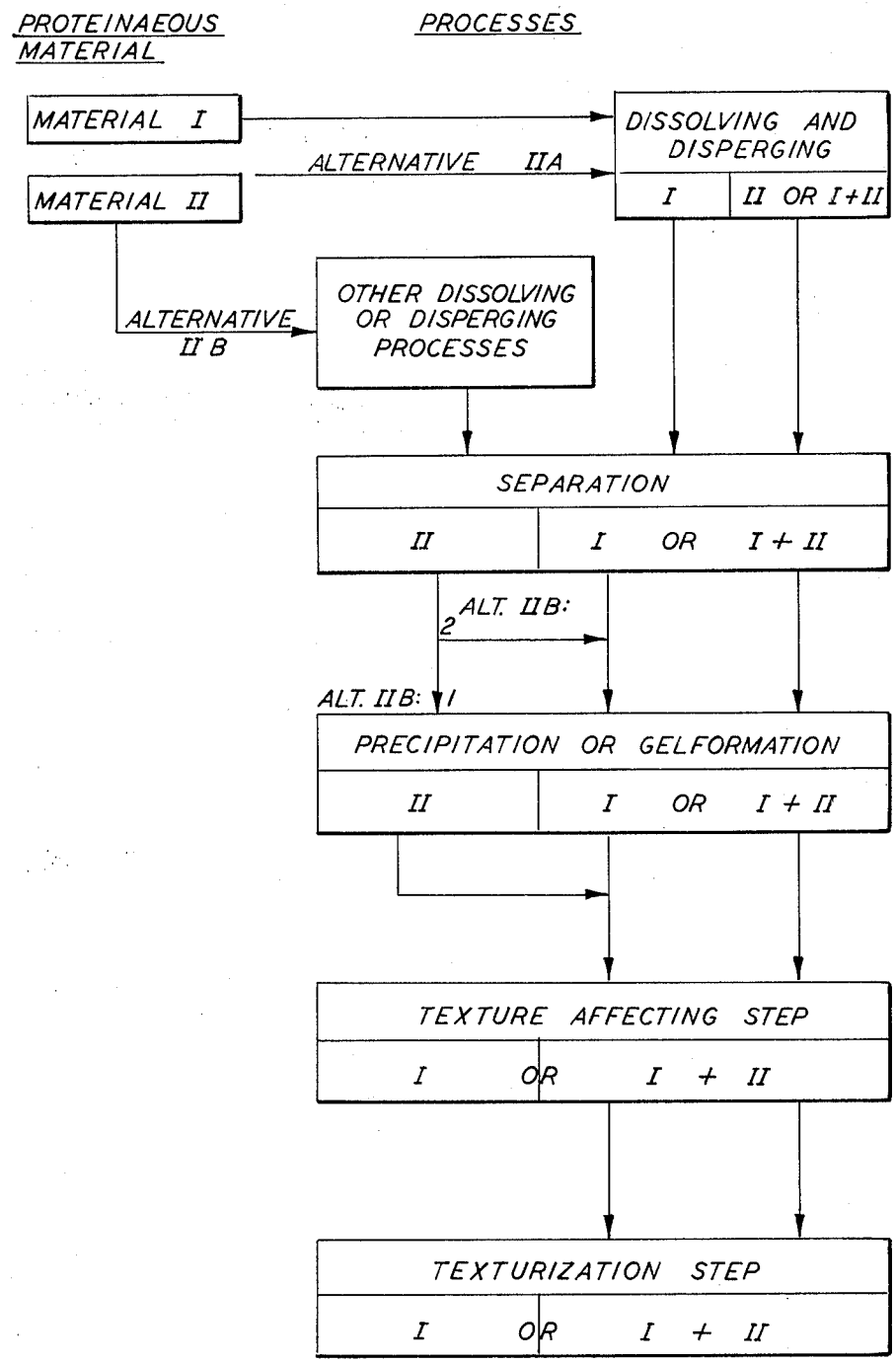
FIG. 1 is a flow diagram schematically showing a process for the preparation of food functional protein.

Specifically, one part by weight of protein in a proteinaceous material is dissolved or sufficiently dispersed in water (1-10, preferably 2-6 parts by weight per one part by weight of carbamide) containing carbamide (2-50, preferably 5-20 parts by weight per one part of protein) in the pH range of 4-7 and at a temperature not exceeding 65° C. a preformation of texture sites occurs, i.e. binding sites released, but left protected when breaking weak bonds within or between proteins. The protein in this dispersion (solution) is then precipitated, preferably according to any one of the folowing principles:

I. Dilution with water or electrolyte solutions or organic solvents or combinations thereof. Temperature and pH can be varied in the intervals 0°-100° C. and 4-6 respectively.

II. Membrane processes where the protein solution containing the dissolving agent is kept in a vessel whose walls completely or partly consist of membranes with selected pore characters, so that the protein dissolving agent, but not the protein, can pass through the membrane pores. Common membrane processes are e.g. dialysis, reversed osmosis and ultrafiltration. Pressure, temperature and pH and flow parameters can be varied.

III. Membraneless diffusion where the protein solution containing the protein dissolving agent is formed into thin layers (0.1-10 mm) and brought into contact with solvent of the kind mentioned under I. Dilution whereby the protein dissolving agent diffuses from the layer into the surrounding solvent whereby the protein in the boundery momentarily precipitates thus stabilizing the boundery during the progressing diffusion of the protein dissolving agent. Temperature and pH can be varied as under I. Dilution.

IV. Mobility separation in which the protein solution containing the protein dissolving agent is subjected to a direct electric field. The charge differences between the protein and the protein dissolving agent result in different migration speed or direction of these two species. This procedure can be combined with membrane technique and is then called electrodialysis.

V. Gravity separation is achieved by subjecting the protein solution containing the protein dissolving agent to strong gravity fields, commonly named ultracentrifugation, whereby the different molecular sizes result in a separation of the protein from the protein dissolving agent.

Preferably the concentration of dissolving or dispersing agent is decreased to less than 10% by weight of the solution containing the protein to effect separation.

The present invention is distinguished over the prior art as follows:

1. Most kinds of protein can be processed, i.e. protein of animal, plant and microbial origin. Different demands in the dissolving, precipitating or gel formation and texture affecting steps can be met with alternative techniques. Different dissolution rates can for instance be used for separation of collagenous tissues from muscle protein.

The proteins in the proteinaceous material need not be completely liquefied. It is sufficient that the carbamide-protein complex is formed to disperse the material in water to enable separation of insoluble matter.

2. The conditions used are sufficiently mild to enable the preformation of texture sites. The mild conditions involve avoiding strongly alkaline and acid conditions and the use of high temperatures.

3. With the preformed texture sites intact, every procedure that causes the carbamide to dissociate from the carbamide-protein complex will be followed by a precipitation of the protein and a returning of the denatured protein to the undenatured state.

The practical methods of dissociation are dilution in water, electrolyte solutions or aqueous organic solvents or by use of membrane technique. We have found that it is not necessary to remove all carbamide in order to achieve optimal precipitation. In practice the concentration of carbamide in water will be lowered to 5-10% by weight in the water phase.

We have also found that the precipitation is a rapid process while the denatured to undenatured protein process is slower. Practically this means that separation of the precipitate from the excess water should be made as soon as possible after precipitation at low temperature (0°-20° C.) and the isoelectric point (normally pH 4.5-6.0) of the protein where its solubility is minimum.

The choice of precipitating or gel formation operation for example dilution or membrane technique, depends somewhat on the protein. A muscle protein where high yields of texturized protein is easily obtained the dilution technique may be chosen, while with some plant protein the yield of texturized protein will be higher in a membrane than in a dilution process.

4. The preformed texture sites of the protein can be further effected in several ways prior to final texturization (a) by adjustment of pH in the range 4.0-10.0
(b) by addition of ions (normally the cations litium, sodium, potassium, ammonium, calcium, magnesium, zinc, iron and the anions chloride, sulfate, phosphate or organic anions) from their corresponding salts,
(c) by addition of small amounts of food acceptable "freeze protecting agents" as e.g. polyvinylpyrrolidon and hydroxy containing compounds such as glycerol, glycols, including polyethylene glycols, sugars and alcohols, preferably lower alkanols, ethanol being most preferred and added in a quantity of 10% by volume of the water volume,
(d) by heat treatment up to 100° C. for up to 30 min.
(e) by addition of other proteins To our knowledge the present invention is the only described chemical method to prepare texturized protein of animal origin. Proteins from muscles, entrails, blood and milk can be prepared into strengthy textures.

By mixing proteins which give less strengthy textures with animal protein at a suitable stage of the process a cotexturized protein preparation can be prepared with an intermediate texture strength determined by the proportions of the mixed proteins.

(f) by addition of non-protein food ingredients such as starch and fat. Thus it is possible to formulate texturized semi-manufactured food combinations.

5. The desired texture expressed in mechanical terms, as affected by one or more of the steps under 4, is developed by freezing at temperatures below the freezing point of the water (0° C. or the depressed freezing point due to the additions) usually at −10° C. to −20° C.

The texture may also be developed in a finished food by introducing the untexturized protein in the food followed by freezing of the food.

Also it is not quite understood and cannot be explained how the preformation of texture sites and the texture affecting step and the final texturization function, it seems as this must be due to the use of the specific dispersing agent according to the invention, i.e. carbamide and guanidine hydrochloride, as the sole protein dissolving agent at mild conditions.

It is not intended to be limited to any theory, but it is believed that denaturation of a protein in water solutions of carbamide is a thermodynamically reversible process (renaturation). When the carbamide concentration is decreased from an initially low carbamide concentration, renaturation might be a fairly rapid process whereas decreasing the carbamide concentration from a high initial level renaturation will be slow.

On denaturation of protein in concentrated carbamide solutions the weak bonds (hydrogen bonds, hydrophobic bonds, van der Waals bonds) within or between proteins will be broken leaving the binding sites which were involved in these bonds still exposed and, provided mild conditions (pH and temperature) are used, protected so they can be activated in new bonds later in the process. This is here called preformation of texture sites.

When the carbamide concentration is again decreased thermodynamically a renaturation of the initial specific bonds should occur. However, this slow process is being replaced by a random bonding resulting in non-specific aggregation. These bonds in the aggregates are further forced together by freezing or drying whereby the random structure is locked resulting in a continuous texture that can withstand mechanical force. This last step (freezing or drying) is called the texturization step.

Between the two steps of texture preformation and texturization a step of texture affecting may be introduced. In these procedures which can be made at an elective stage between texture preformation and texturizing the chemical or physical environment around the binding sites will be changed in order to control the final texture. Texture affecting procedures involve changes in the pH, ionic strength, protein composition, temperature or dielectric properties of the liquid phase. When pH is brought to the isoelectric pH of the protein, the texture will be firmer than when pH is lower or higher than the isoelectric pH. Increasing of the ionic strength also results in less firm textures.

Mixing of different protein species (between precipitation or gel formation and texture affecting step) can also be seen as a way alone or together with other texture affecting procedures like pH adjustment of getting desirable textures of a mixed protein concentrate where texture is balanced against nutritive value for instance.

The texture affecting step is very important because of the possibility to make protein concentrates with variable textures chosen according to intended use of the protein.

In FIG. 1 there is shown a flow chart of the process according to the invention for preparing food functional protein. There is shown alternative processing routes for two protein materials. For instance, material I can be an animal and material II either another animal, a plant or microbial protein material.

Alternative IIA means that materials I and II either are dissolved together or separately, for instance, due to different demands in relation to the initial water and carbamide concentration, different kinds of insoluble matter, etc. Materials I and II can then be joined at different stages of the process, as e.g. after separation of undissolved matter, during the precipitation and gel formation step or the texture affecting step.

Alternative IIB means that material II is either available in liquid form, as e.g. concentrated whey, or is better suited for other dissolving processes. The water of material IIB can thus be used partly as the diluting agent during precipitation of material I+II (alternative IIB:2) or protein IIB after precipitation can be used to influence the properties of the cotextured protein I+II (alternative IIB:1). Alternative II means that the present invention is used not for the dissolving but for preformation of the texture and texturization of protein II together with protein I.

In this FIG. 1 is illustrated how a proteinaceous material I can be dissolved or dispersed, separated from insoluble material, precipitated or gelled, subjected to the texture affecting step and finally the texturization step. This FIG. 1 also shows a proteinaceous material II which can be dissolved or dispersed alone or together with the material I. This material II is thereafter separated from insoluble material and this can be carried out together with the solution of the material I, if desired. The precipitation or gelling can be performed having materials I and II separated. In this way the two different proteins can mutually affect the texture when they are added to each other in the texture affecting step. It is also possible to dissolve or disperse the proteinaceous material II in an alternative route IIB according to any known process and to separate the proteinaceous solution from insoluble material. The solution obtained can thereafter be precipitated or gelled alone or together with the solution obtained from material I. If precipitated along the material II obtained in this way can be used to affect the texture of the material I in the texture affecting step.

From the FIG. 1 is also clear that the process variables in the dissolving or dispersing step can be the carbamide content, the water content, the pH which is to be controlled between 4 and 7 and the temperature which is to be controlled between −5° C. to +65° C. The process variables during the precipitation or gelling are for instance the carbamide content which preferably should be less than 10% by weight, the pH which is preferably to be controlled between 4 and 6 and the temperature which preferably is controlled between 0° C. and 65° C. During the texture affecting step the water content, the electrolyte concentration (ionic strength), the pH which preferably is varied between 4 and 10, addition of organic compounds and temperature are process variables. Finally the texture is developed by freezing or drying.

In the following some examples are given to illustrate the preparation of food functional protein, nutritional value and the use of the functional proteins. These examples are submitted for the purpose of illustration only, so that those skilled in the art may better understand the operation of the invention. These examples are not to be construed as limiting the scope of the invention in any way.

EXAMPLE 1. Preparation of a fish protein concentrate with variable texture

Figure 6:
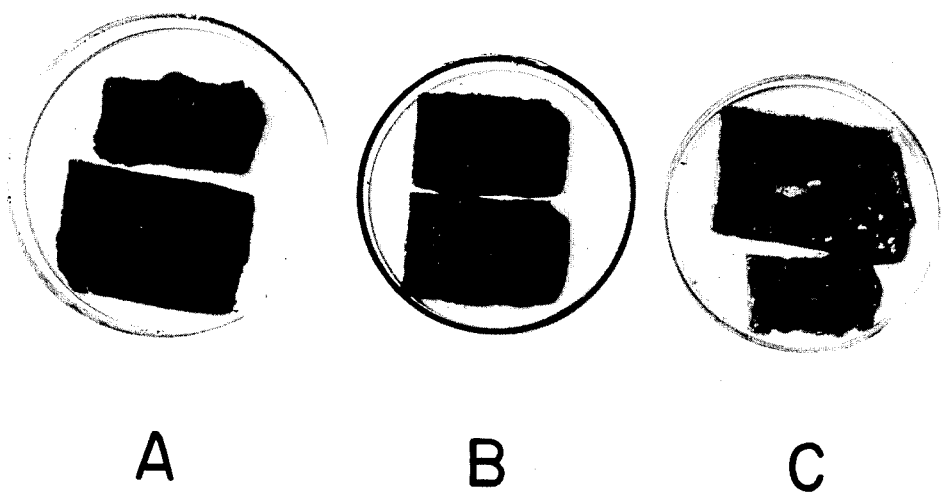
FIG. 6 shows photographs of protein concentrates with selected textures and functional properties and obtained using using texture affecting steps at different pH-values.

Twenty kg minced cod meat (3.25 kg of protein), 38 kg of feed grade carbamide and 40 kg of water were mixed and allowed to stand under gentle agitation at 25° C. and pH 6.0 for 20 hrs. The resulting liquid having a pH of 6.7 was filtered to remove undissolved matter, mainly bones. The carbamide-protein complex was dissociated by dilution of one part of the protein containing liquid with 4 parts of deaerated tap water. pH decreased automatically to 5.6, the isoelectric pH of fish protein which precipitated. After sedimentation, the supernatant solution containing most of the carbamide was drawn off and the protein precipitation slurry centrifuged in a continuous sedimentation centrifuge at 1500×gravity. The protein cake was further rinsed with water to remove excess carbamide. The preparation contained 16% protein and 84% water. The protein preparation was divided into 8 parts. One of those was not further treated whereas five were pH-adjusted by the addition of sodium hydroxide to pH 5.9, 6.6, 7.0, 7.5 and 8.0, respectively. In another five parts the salt content (sodium chloride) varied: 0, 1, 3, 10 and 20% respectively based on the sum of protein and water weights. In the remaining eight samples the salt content was 0, 1, 3 and 5% at pH 5.8 and 7.0. All 18 samples were frozen in plastic trays at −20° C. to develop the texture. After thawing one could see that all protein samples had texturized somewhat different due to the texture affecting treatments. In FIG. 6 three protein concentrates are shown where the texture affecting step involved adjustment of the pH of the precipitated protein to pH 6.0, 7.4 and 7.9, respectively. The pH 6.0 protein is very firm and has a distinct fibrous texture. The pH 7.4 and particularly the pH 7.9 protein are softer and less fibrous than that treated at pH 6.0. Due to the different coarseness of the fibrous texture the optical appearance is different.

Figure 7:
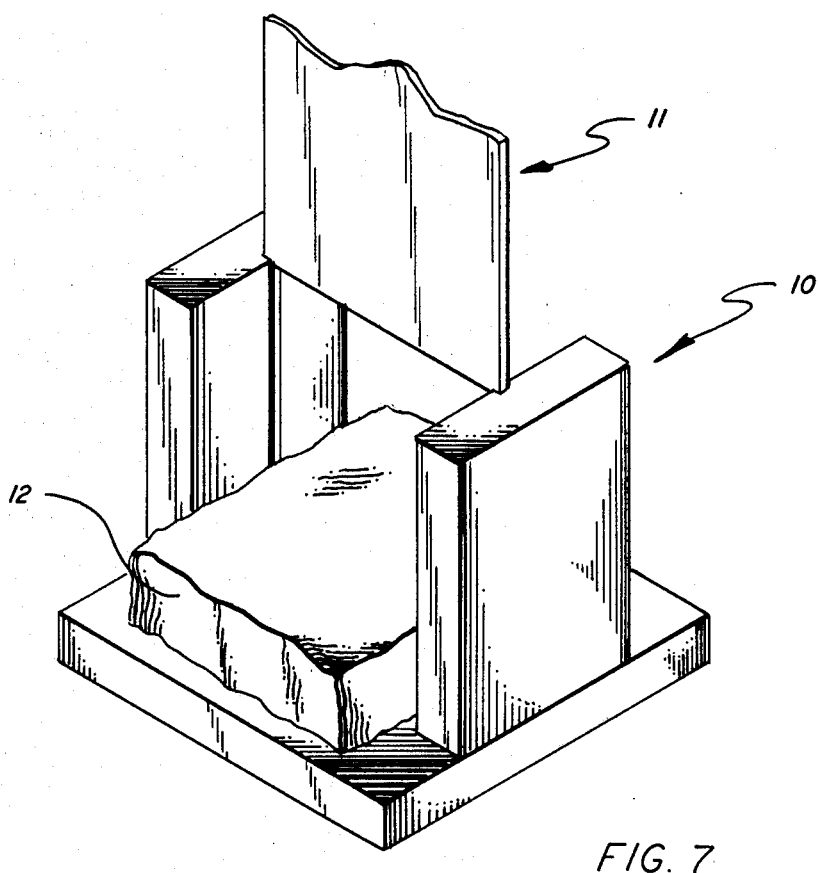
FIG. 7 in perspective is a schematic view of an apparatus for measuring the texture properties.
Figure 8:
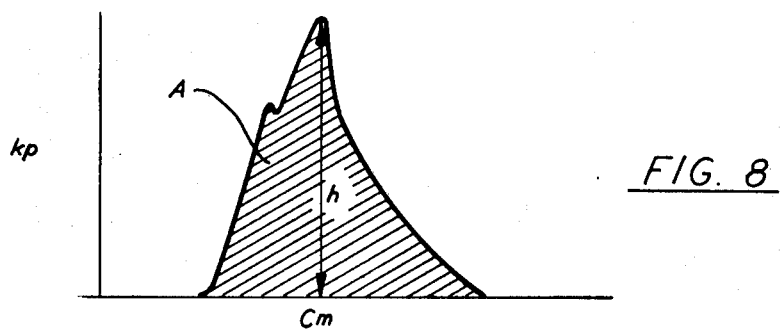
FIG. 8 is a graph illustrating the results obtained in the apparatus of FIG. 7.

In order to evaluate the reological properties of the differently texturized protein concentrate standard samples were prepared from the texturized protein masses which had taken the inner dimensions of the plastic trays used, i.e. 22×28×45 (cm); the standard samples were cut to 4.5×6.0×2.5 cm after room temperature equilibration. From each sample (6 to 7 replicates) force to deformation curves were produced in a universal material testing machine (Instron). Each sample was placed in the meat shearing cell shown in FIG. 7. This cell consists of a U-shaped device with a vertically sliding tool which is then forced downwards against and through the sample at a constant speed of 1 cm/min. The force to deformation curve was recorded. In FIG. 8 a typical curve is shown. On the vertical axis the force (kp) is recorded against the deformation (cm) on the horizontal axis. In these curves the maximum deformation force (kp) tells about the hardness of the material and the maximum deformation work (kp×cm), the area below the curve, tells about the cohesion of the material (kp=kilopond approximately equal to 9.8 N).

Figure 2:
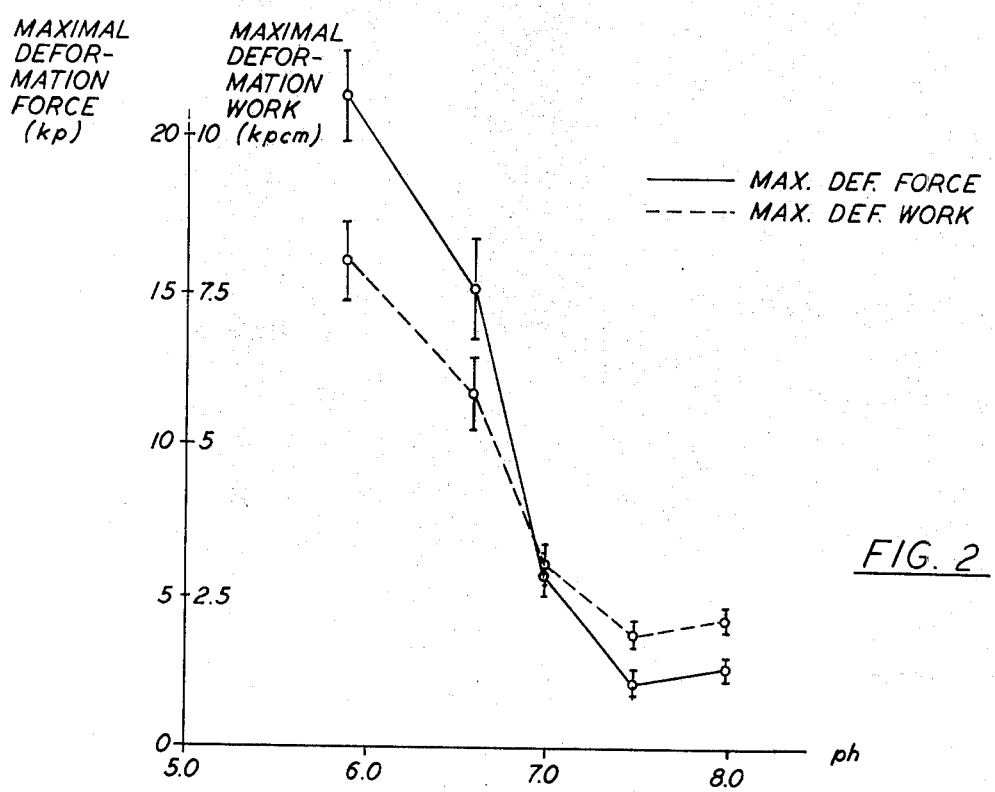
FIG. 2 is a diagram showing the maximum deformation force and work of fish protein as functions of the texturization pH.
Figure 3:
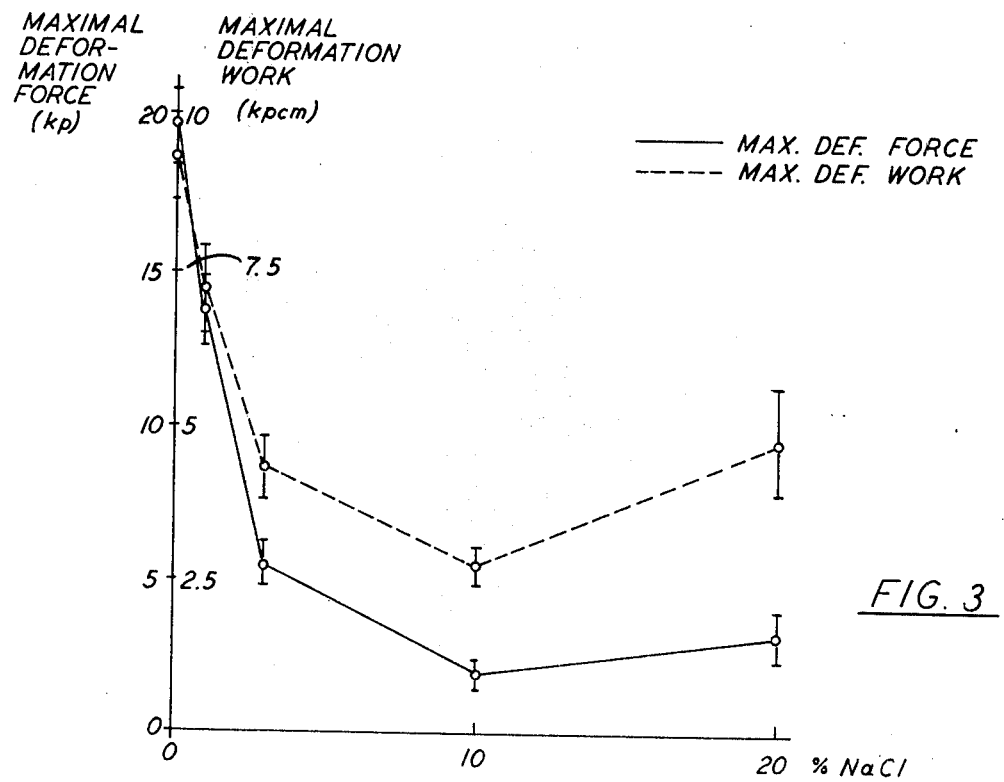
FIG. 3 is a diagram showing the maximum deformation force and work as functions of the concentration of NaCl of fish protein texturized at pH 5.6.
Figure 4:
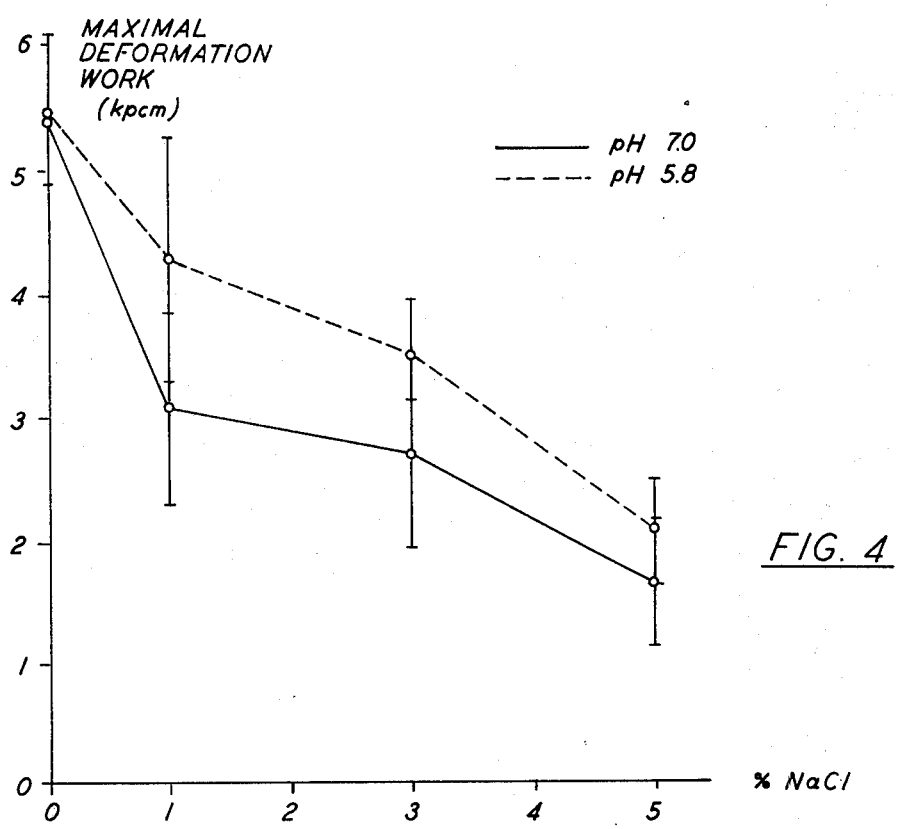
FIG. 4 is a diagram showing the maximum deformation work as a function of the concentration of NaCl of fish protein texturized at pH 5.8 and 7.0.

From FIG. 2, 3 and 4 one can see that small changes both in pH and salt concentration had large effects on the texture strength of the fish protein. These measurements are convertible into sensory terms like chewiness, chewing withstand etc. This shows that a desired texture of a protein preparation can be developed by the present invention.

EXAMPLE 2. Functional properties of a fish protein concentrate

Protein concentrates from fish with two texture strengths were prepared at pH 5.9 (A) and 6.9 (B) respectively as described in Example 1. Each of the texturized fish proteins were allowed to replace equivalent amounts of fish meat to a varying degree in fish pudding. The control puddings were made from 500 g fish meat, 150 g margarine, 75 g wheat flour, 2 eggs, 400 ml of milk (3% fat), 20 g potato starch and 5 g of table salt. Eleven puddings comprising two controls, four containing varying amounts of protein A (pH 5.9) and 5 containing varying amounts of protein B (pH 6.9) were baked in an oven at identical conditions. On visual inspection it was noted that water and fat had separated in the 100% substitution samples in both the A and D series but not in the others. The puddings were tested by a trained panel who scored the smell, taste, colour, appearance and consistency of the puddings. The usefulness of the two protein preparations expressed at the highest substitution level for a significant difference from the control samples was 20% for preparation A (smell and taste limiting) and 50% for preparation B (smell, taste and consistency limiting). All, except A 50% were ranked acceptable as food although a difference from the control was observed (Table 3). The conclusion is that it is highly desirable to be able to use protein preparations with controlled texture strength.

Figure 5:
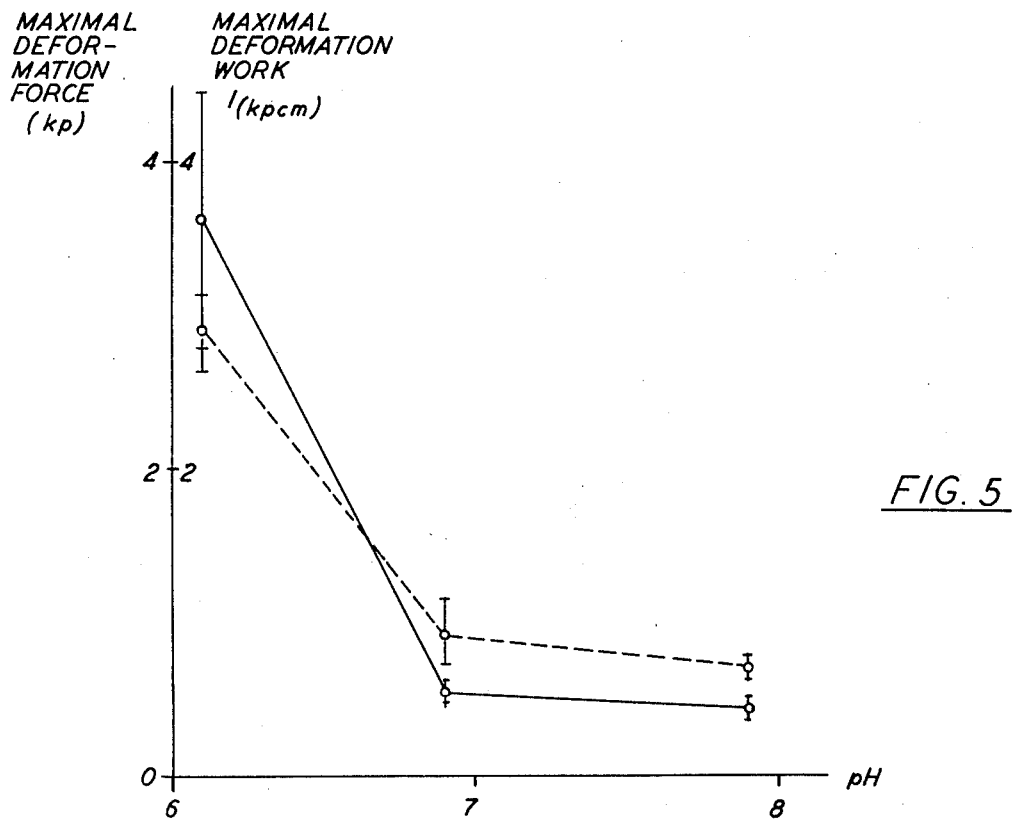
FIG. 5 is a diagram showing the maximum deformation force and work as functions of the texturization pH for protein preparation from hog's stomach.

EXAMPLE 3. Preparation of three protein concentrates from hog stomach with controlled texture strength A protein preparation was made from hog stomach in the same manner as in Example 1. Undissolved matter consisted mainly of cartilage and fat which were separated off from the liquid. The precipitated protein was divided into three parts and the pH was adjusted to 6.1, 6.9 and 7.9 respectively. After texturization at −20° C. the texture of the samples were analyzed as in Example 1. In FIG. 5 one can see that the texture strength of a hog stomach protein concentrate can be controlled over a wide range by small changes in pH like the fish protein concentrate. The appearance of some protein concentrates is shown in FIG. 6.

EXAMPLE 4. Preparation of a cotexturized whey-blood protein concentrate

One liter of a whey protein concentrate, containing 11% protein, obtained by removing water and low molecular solutes mainly lactose from whey, 11 g of animal blood hemoglobin and 1 kg of feed grade carbamide were mixed at pH 6.0 and 20° C. After a few hours the protein mixture was precipitated at pH 5.6 and washed and the resulting protein cotexturized at pH 5.6 and 6.0 and −20° C. They whey-blood protein complex texturized indistinguishable from each other into a firm textured product having the appearance of cooked meat, the one pretreated at pH 5.6 having a stronger texture than that pretreated at pH 6.0.

This example shows that it is possible to cotexturize animal proteins.

EXAMPLE 5. Preparation of a mixed food functional wheat and haddock protein

Dried wheat germs, 150 g, and fresh deskinned haddock, 50 g, were cotreated according to Example 4. A control containing the fish material alone was prepared. An upper lipid fraction and a lower fraction consisting of deproteinized cells and fishbones could be separated from the middle fraction consisting of the dissolved proteins and the protein dissolving aid. The protein was precipitated and texturized as in Example 4, whereby a strongly water-holding protein concentrate was obtained which had a large volume loose texture, different from that obtained with fish alone.

This example shows that proteins of vegetable and animal origin can be cotexturized and that the texture strength can be controlled by combination of vegetable and animal proteins.

EXAMPLE 6. Texturization of food combinations

One hundred grams of precipitated whey protein (as in Example 4 without the hemoglobin) containing 15% of protein and 85% of water were thoroughly mixed with 10 grams of soy oil and 5 g of potato starch. This combination was texturized at pH 5.6 and $-20°$ C. A control containing the whey protein alone was also prepared. Both preparations had a meat-like texture, the one containing fat and starch was more easy to grind than that containing the whey protein alone.

This example shows that semi-manufactured food combinations can be prepared, the texture of them being developed by the protein content and that is is possible to control the texture of the food combination by the composition of the combination.

EXAMPLE 7. Influence of organic solvent and temperature on the texture of fish protein concentrate A fish protein precipitation was made according to Example 1. It was divided into ten parts. Prior to texturization the preparations were treated at 60° C. and 100° C. for ten minutes at pH 5.8 and 6.8, or with 1% and 3% ethanol at pH 5.8 and 6.8. The two remaining preparations were adjusted to pH 5.8 and 6.8 respectively with no further additions. All ten samples were texturized at $-20°$ C. The pH 5.8 sample had a much firmer texture than the 6.8 sample as expected from FIG. 2. The heat treated samples had more elastic textures and were whiter than the controls. The 1% ethanol samples were indistinguishable from the controls while the 3% ethanol samples had more brittle textures and were whiter than the controls. The increased whiteness of the samples is not due to a bleaching effect but to the optical (reflectance) effect when the network dimensions of the protein texture decreased.

This example shows that the texture can be influenced after dissociation of the carbamide-protein complex by heat and by small additions of water soluble organic solvents.

EXAMPLE 8

A protein gel was prepared from 1 kg of swinetrachea by a procedure similar to Example 3 except that isoelectric precipitation was replaced by gel formation through applying membrane technique. The meat-gel was divided into two parts, one being frozen at $-20°$ C. to develop the texture, the second one was not texturized. Both the minced textured and the untextured protein was used to replace 25% of the minced meat in hamburgers. Control hamburgers with no substitution were also prepared. The hamburgers containing the untexturized protein material were frozen at $-20°$ C. and then thawed. All three series of hamburgers were fried and subjected to sensory evaluation. No difference could be noted in the texture of the hamburgers.

This example shows that the protein with preformed texture sites can develop its texture after mixing it into a complete food item.

EXAMPLE 9. Texturization of protein combinations

A fish protein solution in a carbamide-water system was prepared as in Example 1, however, only on a one tenth scale. A water solution of hemoglobin was obtained from animals blood, first separating it into a plasma and a blood cell fraction. On dilution four times of the blood cell fraction in water the blood cells burst and their content of hemoglobin dissolves. The water solution of hemoglobin contained 10% of hemoglobin protein and 325 ml of it was added to the carbamide-water solution of fish protein whereby the weight ratio of fish protein to hemoglobin protein was 9 to 1 in the solution. Water was then added to the mixture as in Example 1 (one tenth scale) to precipitate the fish-hemoglobin protein. In this case the combined proteins precipitated at pH 6.0 due to the higher isoelectric pH of hemoglobin. The protein combinate was then cotexturized at pH 6.0 by freezing. The resulting cotexturized fish-hemoglobin protein concentrate had a somewhat less firm texture than the fish protein obtained at pH 5.6. The colour was like that of cooked meat. Instead of a water solution of hemoglobin a lactose reduced whey protein concentrate (10% of protein) could be used; this concentrate can for instance be obtained by concentrating whole whey in a membrane process.

This example shows that it is possible to cotexturize two proteins where one of them had not run through the carbamide process but could be used in order to control the texture and functional properties of the final protein concentrate.

EXAMPLE 10. Texturizing by drying

A fish protein precipitate was prepared according to Example 1; however, on a one tenth scale. Instead of freezing the protein precipitate was subjected to drying at reduced pressure in a vacuum oven. The protein precipitate was placed in a glass tray so that the protein slurry had a depth of about 0.5 cm. This tray was then placed on a heated steel body which had a temperature of 50° C. The tray on the steel body was then placed in the vacuum oven and dried for 2 hrs at 50° C. and a pressure of about 5 mm Hg (665 Pa). During this procedure the protein precipitate was dried without freezing. The resulting protein concentrate was brittle and had a fibrous texture which swelled in water to a texture of the same type as when freezing was used as the texturization step.

This example shows that drying can be used as a texturizing procedure.

This example shows that the protein with preformed texture sites can develop its texture after mixing it into a complete food item.

In all these examples carbamide can be replaced by guanidine hydrochloride. In the latter case a much stronger texture is obtained as compared with the corresponding textures obtained with carbamide treatment.

This is particularly evident with proteins of plant and microbial origin.

TABLE I

Grams of amino acids per 16 g N in different proteins prepared by carbamide extraction

| Protein type | Cod | Cod | Haddock | Herring | Peas |
|---|---|---|---|---|---|
| Temp. °C. | 8 | 23 | 5 | 23 | 23 |
| Time | 48 hrs | 2 weeks | 5 months | 18 hrs | 18 hrs |
| N % | 15.40 | 15.56 | 14.04 | 14.86 | 12.96 |
| Lys | 10.06 | 9.45 | 9.32 | 11.17 | 7.43 |
| Thr | 4.41 | 5.06 | 5.26 | 5.04 | 4.15 |
| Met | 3.63 | 3.53 | 3.66 | 3.67 | 0.9 |
| Val | 5.56 | 5.33 | 5.95 | 5.83 | 5.28 |
| Leu | 8.91 | 8.41 | 9.04 | 8.51 | 7.35 |
| Ile | 5.25 | 5.12 | 5.62 | 4.66 | 4.31 |
| Phe | 4.35 | 4.31 | 5.27 | 4.50 | 4.99 |
| Tyr | 4.12 | 4.14 | 4.89 | 3.06 | 3.70 |
| Trp[x] | — | — | — | — | — |
| Arg | 7.06 | 6.30 | 7.43 | 8.15 | 7.59 |
| His | 2.38 | 2.28 | 2.52 | 2.53 | 2.45 |
| Cys[x] | — | — | — | — | — |
| Ser | 5.00 | 4.72 | 4.99 | 4.79 | 4.69 |
| Glu | 17.62 | 16.27 | 17.00 | 14.55 | 19.54 |
| Asp | 12.38 | 11.84 | 12.46 | 10.76 | 11.42 |
| Gly | 4.75 | 4.63 | 4.86 | 5.56 | 4.24 |
| Ala | 6.17 | 5.07 | 6.65 | 7.04 | 3.92 |
| Pro | 3.93 | 3.78 | 3.75 | 4.26 | 4.48 |

[x]Cys and Trp not determined

TABLE II

Biological nutritional value of cod protein prepared by carbamide extraction

| | Dissolving conditions | | casein comparison |
|---|---|---|---|
| | 6 M carbamide 48 hrs, 8° C. | 6 M carbamide 2 weeks, 23° C. | |
| D | 97.2 ± 0.7 | 96.9 ± 0.5 | 96–99 |
| BV | 88.3 | 89.3 | 70–80 |

D = Digestability, percent absorbed N of consumed N, corrected for endogeneous fecal N-losses.
BV = Biological value, percent retained N of absorbed N, corrected for endogeneous urinary N-losses.

TABLE III

Sensory evaluation of fishpudding containing varying amounts of two differently textured fish protein concentrates as substitutes for the fish meat in the original recipe.

| Protein concent. | Subst. level % | off-smell $\bar{X}$ sign.[2] | smell $\bar{X}$ sign. | off-taste $\bar{X}$ sign. | taste $\bar{X}$ sign. | mis-color $\bar{X}$ sign. | appearance $\bar{X}$ sign. | consistency $\bar{X}$ sign. | Acceptance as a food |
|---|---|---|---|---|---|---|---|---|---|
| A | 0[3] | 0.22 | 8.00 | 0.11 | 8.00 | 0.22 | 7.78 | 7.78 | yes |
| | 10 | 0.56 − | 7.67 − | 1.00 − | 7.22 − | 0.33 − | 8.00 − | 7.33 − | yes |
| | 20 | 1.33 +− | 6.67 + | 2.11 + | 6.33 + | 0.33 − | 7.89 − | 7.00 − | yes |
| | 50 | 2.44 + | 6.22 + | 3.78 + | 4.67 + | 1.00 + | 6.67 +− | 4.50 + | doubtful |
| B | 0[3] | 0.25 | 8.13 | 0.25 | 7.50 | 0.25 | 7.75 | 7.71 | yes |
| | 10 | 0.87 − | 8.00 − | 0.25 − | 7.88 − | 0.50 − | 7.75 − | 7.38 − | yes |
| | 20 | 0.63 − | 7.88 − | 0.75 − | 7.38 − | 0.25 − | 8.13 − | 7.50 − | yes |
| | 50 | 1.25 − | 6.88 + | 2.25 + | 5.38 + | 0.63 − | 7.13 − | 5.00 + | yes |
| | 75 | 1.88 + | 6.13 + | 2.50 + | 4.63 + | 3.63 + | 4.13 + | 3.63 + | yes |

[1]The degree of off-smell, off-taste and mis-color was evaluated on a 0 to 8 scale where 0 means "no" and 8 "very strong"
Smell, taste, appearance and consistency were evaluated on a 1 to 9 scale where 1 means "very bad" and 9 "very good"
[2]Significance means significant difference from the controls (0) in the A and B series respectively
+ = significant difference
− = no significant difference
+− = doubtful
[3]Control

We claim:

1. A process for preparing a food-functional texturized protein in solid shapes that can withstand mechanical force, comprising a first step of dispersing undenatured proteinaceous starting material in a water solution of a protein dispersing agent solely selected from the class consisting of carbamide and guanidine hydrochloride and under mild conditions comprising a pH range of about 4–7 and a temperature not exceeding about 65° C., thereby forming a dispersion in the water of dispersed protein having a preformation of texture sites, a second step of separating said agent from said dispersed protein at temperatures not exceeding 65° C., thereby forming a precipitate of water-containing protein having a gel formation retaining said texture sites and inherently capable of texturizing by freezing or drying, a third step of separating said gel formation from excess water, and a fourth step of texturizing said gel formation by freezing or drying to form said food-functional texturized protein.

2. The process of claim 1 in which the final texture of said food-functional protein is controlled by a texture-affecting procedure used between said second and fourth steps and comprising alone or in combination changing the pH in the range of 4–10, the ionic strength, the protein composition, the temperature up to 100° C. or the dielectric properties of the water phase of said gel formation.

* * * * *

UNITED STATES PATENT AND TRADEMARK OFFICE
CERTIFICATE OF CORRECTION

PATENT NO. : 4,260,644
DATED : April 7, 1981
INVENTOR(S) : Caj E. A. Eriksson and Svein Tjelle It is certified that error appears in the above—identified patent and that said Letters Patent is hereby corrected as shown below:

Column 7, line 13, cancel "-20°C" and replace with
-- -30°C--.

Column 13, Table 1, under the heading "Peas", cancel "0.9" and replace with --0.96--.

Signed and Sealed this

Twenty-first Day of July 1981

[SEAL]

Attest:

GERALD J. MOSSINGHOFF

Attesting Officer

Commissioner of Patents and Trademarks